UNITED STATES PATENT OFFICE.

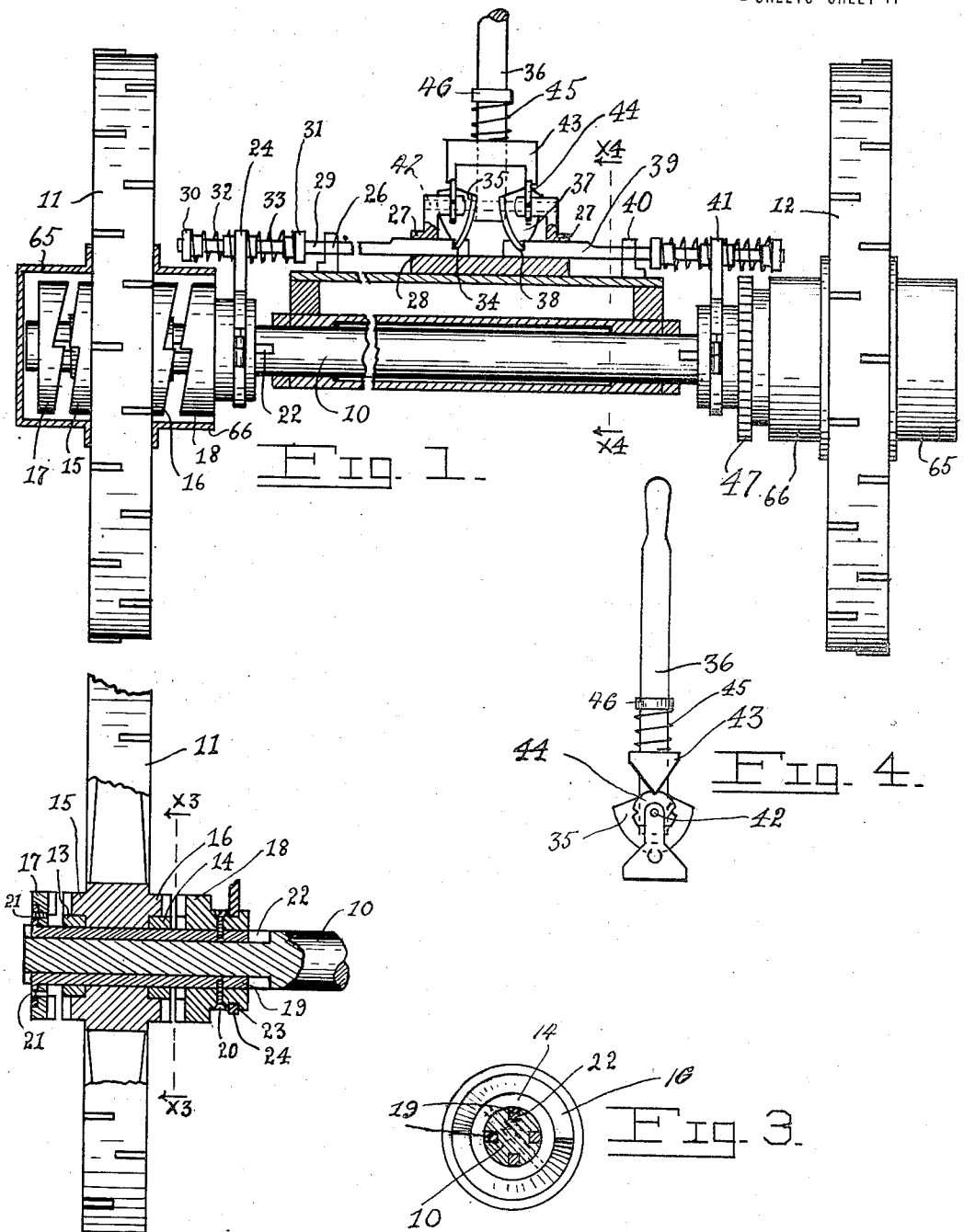

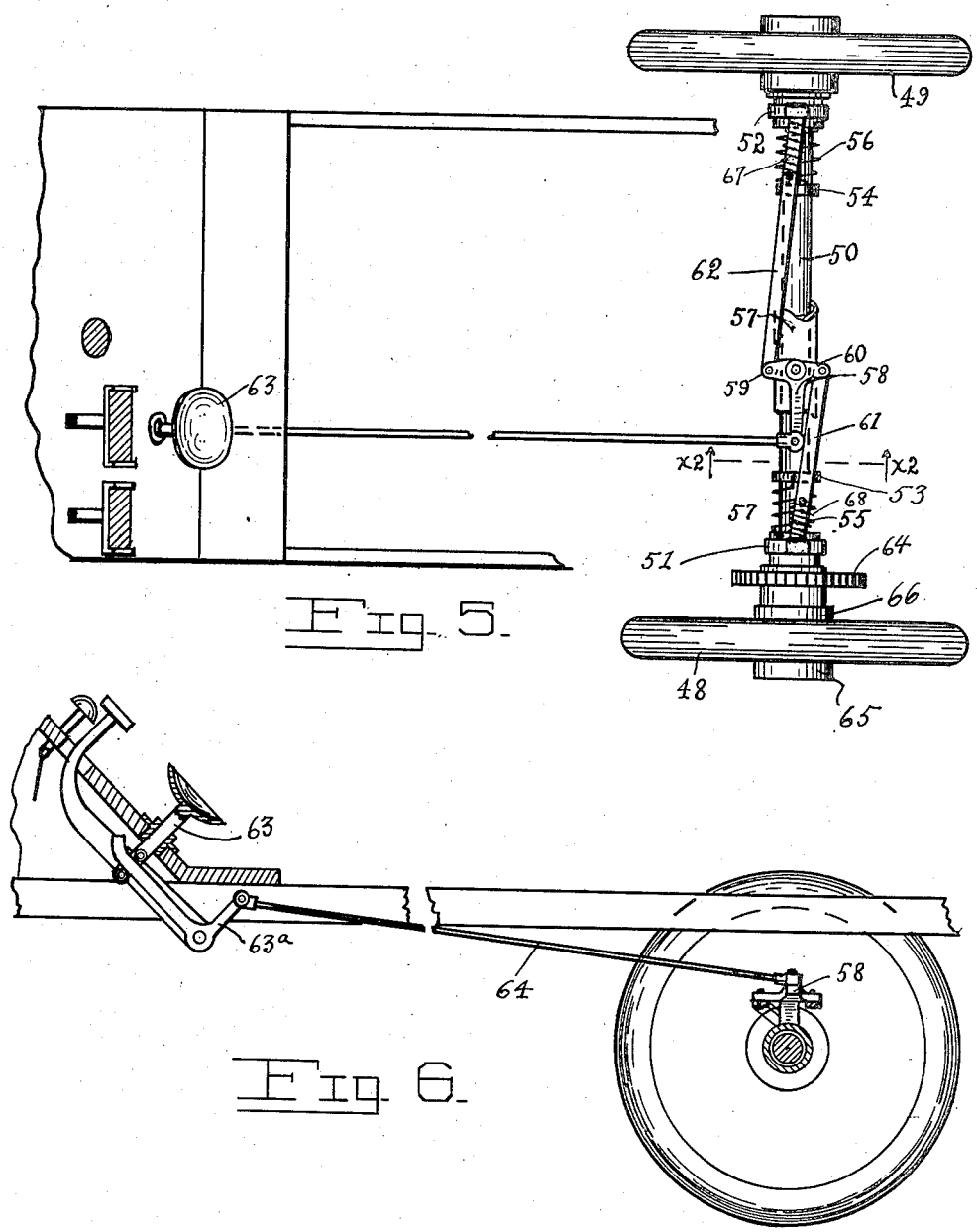

ABE BOWMAN, OF LONG BEACH, CALIFORNIA.

TRANSMISSION MECHANISM.

1,312,609.  Specification of Letters Patent.  Patented Aug. 12, 1919.

Application filed May 23, 1918. Serial No. 236,077.

*To all whom it may concern:*

Be it known that I, ABE BOWMAN, a citizen of the United States, residing at the city of Long Beach, in the county of Los Angeles, State of California, have invented new and useful Improvements in Transmission Mechanism for Wheel-Propelled Apparatus, of which the following is a specification.

My invention relates to mechanism for transmitting the motive power from or to driving wheels of wheeled mechanism which travels over the ground and the object thereof is to produce simple mechanism by means of which power can be applied to cause such mechanism to travel either forward or backward.

In the drawings forming a part of this application Figures 1 to 4 show the mechanism adapted for use in a grass or other cutting machine.

Figs. 5 and 6 show the mechanism adapted for use in an automobile.

Fig. 1 is an end elevation partly in section and partly broken away of so much of a mowing machine as is required to illustrate my invention.

Fig. 2 is a central section of one of the hubs of the driving wheels of Fig. 1 and connected parts.

Fig. 3 is a section on the line 3—3 of Fig. 2 with the outer parts of the wheel omitted.

Fig. 4 is a side elevation of the control lever.

Fig. 5 is a top plan of a fragment of as much of an automobile as illustrates my invention.

Fig. 6 is a detail of the main operating lever and connections.

Referring to Figs. 1 to 4 of the drawings, 10 is the axle on which are revolubly mounted the driving wheels 11 and 12 of a grass or grain cutting machine. These wheels are held from longitudinal movement on the axle by collars of the same construction and location which are bolted to the shaft by bolts not shown. In Fig. 2 two of the these collars 13 and 14 are shown. Each wheel is locked to the shaft 10 by clutches of identical form and like location and only one will be described. Wheel 11 has formed preferably integral with and a part of its hub the female member 15 of the outer clutch and the female member 16 of the inner clutch.

The male member 17 of the outer clutch and the male member 18 of the inner clutch are connected together by splines 19. I have shown four of these splines but there may be any desired number. These splines are secured to the inner male clutch member by screws 20 and to the outer male clutch member by screws 21 which pass through the outer turned ends of the splines. Splines 19 have a longitudinal movement in spline ways 22 in axle 10. The male members of the inner clutch have an annular groove 23 in which is mounted yoke 24. Passing through the arm of yoke 24 and through bearings 26 and 27 secured upon platform 28 of the machine which is carried by axle 10 is a rod 29. Rod 29 has secured thereto collars 30 and 31. Between collar 30 and yoke 24 and coiled around rod 29 is a spring 32 and between the yoke and collar 31 is a like spring 33. Rod 29 has a notch 34 in its inner end in which is received a cam blade 35, which blade is mounted on the lower end of operating lever 36. Lever 36 has mounted thereon a reversely operating cam blade 37 which is received in a notch 38 in rod 39. Rod 39 passes through bearings 27 and 40 and through the arm of yoke 41, which yoke is mounted on the male member of the inner clutch at that side, and has collars and springs like rod 29. The clutch members on this side of the machine are constructed and mounted like those at the other side of the machine and need not be further described. Lever 36 is rockably mounted in bearings 27 by a bolt 42 and has slidably mounted thereon a U-shaped detent 43, which detent engages a sector 44 to keep the lever from accidental movement. A spring 45 between collar 46 and detent 43 holds the detent in engagement with sector 44 until force is applied to the lever to move it. The male member of one of the inner clutches carries an operating spur gear 47 which is operatively connected to the sickle driving mechanism not shown.

When the machine is drawn forward it is obvious that when the members of the outer clutches are thrown into engagement the sickle driving mechanism will be operated to cut grass or grain. Should the sickle become clogged the machine can be backed, the outer clutches disengaged and the inner clutches engaged and the sickle is driven reversely to its cutting motion and thus frees itself. The clutches are then reversed and the cutting of grass or grain resumed.

When the male members of all the clutches are disengaged the sickle driving mechanism is not operated. Other operating means may be used to position the male clutch members.

Referring to Figs. 5 and 6, the back wheels 48 and 49 of an automobile are mounted on axle 50 and are provided with clutches like wheels 11 and 12. The male members of the inner clutches have yokes 51 and 52 mounted thereon like 24 is mounted. Axle 50 has secured thereto collars 53 and 54 and secured to said collars and clutches are tension springs 55 and 56 which normally hold the outer clutch members in engagement. On housing 57 is mounted a lever 58 which has arms 59 and 60. Arm 59 is connected by rod 62 with yoke 52. Arm 60 is connected by rod 61 with yoke 51. An operating foot pedal 63 is slidably mounted on the chassis and is connected to bell crank lever 63$^a$ which lever is connected by rod 64 with lever 58. A gear 64 on one of the male members of an inner clutch is operatively connected to the engine, not shown. Springs 67 and 68 provide yielding means to allow one of the clutches to slide when the inner clutches are engaged.

When the driver desires to back his car he places his heel upon pedal 63 and through connecting mechanism first disengages the outer clutches and then engages the inner clutches when the power shaft can be reversed in the usual manner and the wheels will be run backward.

If desired a single wheel may be provided with clutches and may be the driving or driven wheel. Caps 65 secured to the wheels protect the outer clutch members from dirt. Collars 66 secured to the wheels protect the inner clutch members from dirt.

Having described my invention, I claim,

1. In a transmission mechanism an axle having spline ways therein; wheels revolubly mounted on said axle but not movable longitudinally thereon; female clutch members secured to the hubs of said wheels; on both faces thereof; male clutch members slidably mounted on said axle opposed to the female clutch members; splines connecting said male members, said splines sliding in said spline ways: and means to position said male clutch members.

2. In a transmission mechanism an axle having spline ways therein; wheels revolubly mounted on said axle but not movable longitudinally thereon; female clutch members secured to hubs of said wheels on both faces thereof; male clutch members slidably mounted on said axle opposed to the female clutch members; splines connecting said male members, said splines sliding in said spline ways; means to position said male clutch members; and an operative conection between said male clutch members and other mechanism.

3. In a mechanism of the class described, a frame; an axle having spline ways therein revolubly mounted in said frame; a wheel revoluble on said axle and contacting with the ground when the machine is being operated and constituting the driving power of the other parts when operatively connected thereto, said wheel having female clutch members on both faces of the hub thereof; male clutch members slidably mounted on said shaft and revoluble therewith and opposed to said female clutch members and adapted to engage either or be disengaged from both; means to connect said male members, said connecting means passing through the spline ways in the axle; and an operative connection from said male clutch members to other mechanism.

In witness that I claim the foregoing I have hereunto subscribed my name this 17th day of May, 1918.

ABE BOWMAN.